United States Patent [19]
Amimoto et al.

[11] Patent Number: 5,142,849
[45] Date of Patent: Sep. 1, 1992

[54] AQUATIC PLANT CUTTING APPARATUS AND AQUATIC PLANT RECOVERY BOAT EQUIPPED WITH THE APPARATUS

[75] Inventors: Tomohiko Amimoto, Sakura; Shoji Takeuchi, Ichihara, both of Japan

[73] Assignee: Mitsui Engineering & Shipbuilding Co., Ltd., Tokyo, Japan

[21] Appl. No.: 710,485

[22] Filed: Jun. 5, 1991

[30] Foreign Application Priority Data

Sep. 28, 1990 [JP] Japan .................................. 2-257168

[51] Int. Cl.⁵ .......................................... A01D 44/00
[52] U.S. Cl. .......................................................... 56/8
[58] Field of Search .......................... 56/8, 9, 289, 293

[56] References Cited

U.S. PATENT DOCUMENTS

| | | | |
|---|---|---|---|
| 2,949,003 | 8/1960 | Wilcox | 56/8 |
| 3,130,531 | 4/1964 | Woleslagle | 56/8 |
| 3,499,271 | 3/1970 | Drigert et al. | 56/8 |
| 4,416,106 | 11/1983 | Hawk | 56/8 |

Primary Examiner—Thuy M. Bui
Attorney, Agent, or Firm—Armstrong & Kubovcik

[57] ABSTRACT

An aquatic plant cutting apparatus comprises a first fixed edge having a ribbon-like shape and having a cutting edge portion at its edge and at least one rotary edge juxtaposed along the front edge portion of the first fixed edge, and an aquatic plant recovery boat is constituted by fitting the aquatic plant cutting apparatus to floating means having a propeller through a connection member.

14 Claims, 9 Drawing Sheets

AQUATIC PLANT CUTTING APPARATUS AND AQUATIC PLANT RECOVERY BOAT EQUIPPED WITH THE APPARATUS

BACKGROUND OF THE INVENTION

This invention relates to an aquatic plant cutting apparatus capable of cutting efficiently, reliably and quickly those submersed plants and rooted plants with floating leaves or emersed plants which grow abnormally with eutrophication of rivers, lakes and ponds, and to an aquatic plant recovery boat equipped with such a cutting apparatus.

Generally, aquatic plants are classified into five groups, i.e. floating plants, rooted plants with floating leaves, submersed plants, emersed plants and wetland plants, in accordance with the forms of their growth. Several cutting apparatuses for the floating plants and the rooted plants with floating leaves have been proposed and have already been put into practical application.

On the other hand, the wetland plants have their roots fastened firmly into the soil; hence, they can be cut off by the same mowing method as with on-land weeds. Since the submersed plants float on the water surface and in water, however, they are driven out forward and cannot be cut off smoothly when a disc-like single edge cutter rotating at a high speed is brought close to them. As a result, the submersed plants having their roots in the river bed and growing in water must be removed by a herbicide or they are left as such in many cases. However, the use of the herbicide should be restricted because it greatly affects the environment. Accordingly, effective means for removing aquatic plants growing in reservoirs and raceways has been desired earnestly.

Among aquatic plant cutting apparatuses, a so-called "slide system" aquatic plant cutting apparatus wherein a cutter edge slides is known. The slide system aquatic plant cutting apparatus includes a two-edge system and a three-edge system. However, the two-edge system involves the problem that since the cutting edges themselves are small and since they move in a transverse direction with respect to an advancing direction of the aquatic plant cutting apparatus, the aquatic plants floating in water are pushed away in the advancing direction of the aquatic plant cutting apparatus and cannot be cut off smoothly.

On the other hand, one of the moving edges of the three-edge slide system has the function of restricting the aquatic plants and the other of the moving edges has the cutting function. Therefore, the three-edge system has higher aquatic plant cutting performance than the two-edge system but its operation speed is limited because the moving blades are of the slide type.

SUMMARY OF THE INVENTION

The present invention is directed to solve these problems with the prior art technologies and is directed to provide an aquatic plant cutting apparatus capable of cutting aquatic plants efficiently, reliably and quickly while restricting the aquatic plants.

It is another object of the present invention to provide an aquatic plant recovery boat equipped with an aquatic plant cutting apparatus capable of cutting aquatic plants efficiently, reliably and quickly, and being able to recover efficiently the cut aquatic plants.

An aquatic plant cutting apparatus in accordance with the present invention comprises a frist fixed edge having a ribbon-like shape and having a cutting edge at its front edge portion, and at least one rotary edge juxtaposed along the front edge portion of the first fixed edge.

When the aquatic plant cutting apparatus is constituted by the first fixed edge having a ribbon like shape and having a cutting edge at its front edge portion nad at least one rotary edge juxtaposed along the front edge portion of the first fixed edge as described above, the aquatic plants can be cut efficiently, reliably and quickly while they are being restricted by the first fixed edge and the rotary edge. Furthermore, if a second fixed edge or edges corresponding to the rotary edge(s) are disposed in a comb-tooth like shape at the front edge portion of the first fixed edge, the restriction function of the aquatic plants can be further improved. A hydraulic motor is used preferably as a driving source for rotating the rotary edges.

The rotary edge is formed preferably by disposing radially at least one blade equipped with a cutting edge. Though the blade equipped with a cutting edge may be trapezoidal in shape, it is more preferably spindle-shaped because the aquatic plants can be cut more easily and efficiently. The force of restriction of the aquatic plants can be improved if the foremost tip of the blade equipped with a cutting edge projects from the root of the blade in the rotating direction of the rotary edge. Furthermore, both the restriction function of the aquatic plants and cuttability can be improved if the cutting edge of the blade has a zigzag shape like a saw-tooth shape.

Though the second fixed edge may be trapezoidal in shape, the spindle shape increases cuttability of the aquatic plants. If the cutting edge of the second fixed edge is zigzag like a saw-tooth, both the restriction function of the aquatic plants and cuttability can be improved.

The restriction function of the aquatic plants can also be improved if the cutting edge of the first fixed edge is curved for each minimum constituent unit of the aquatic plant cutting apparatus. Furthermore, this restriction function of the aquatic plants can be improved if the cutting edge of the first fixed edge is zigzag like a saw-tooth shape.

Aquatic plants growing in a wide area can be cut efficiently by an aquatic plant recovery boat produced by fitting an aquatic plant cutting apparatus comprising a first fixed edge having a ribbon-like shape and having a cutting edge at its front edge portion and at least one rotary edge juxtaposed along the front edge portion of the first fixed edge, to floating means having a propeller through a connection member. If a conveyor or a grab for recovering the aquatic plants is disposed between the floating means described above and the aquatic plant cutting apparatus, the cut aquatic plants can be recovered efficiently.

DESCRIPTION OF THE PREFERRED EMBODIMENTS

Figure 1:
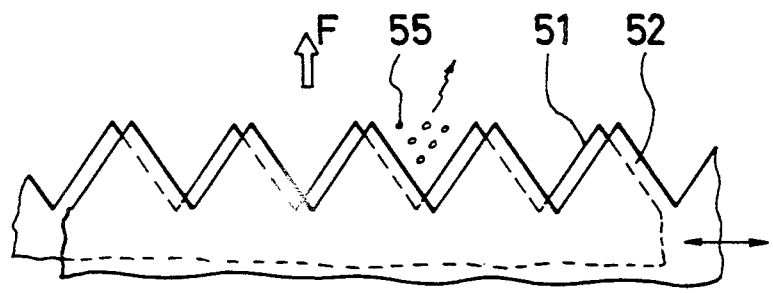
FIG. 1 is a plan view of a conventional slide system aquatic plant cutting apparatus.

As has been described already, an aquatic plant cutting apparatus of a so-called "slide system" wherein cutting edge slides is known as an aquatic plant cutting apparatus. In an aquatic plant cutting apparatus of a so-called "double edge system" in which a moving edge 52 reciprocates in a transverse direction with respect to a fixed edge 51 as indicated by arrow in FIG. 1, both the fixed edge 51 and the moving edge 52 are by themselves small. Moreover, since the moving edge 52 moves in the transverse direction relative to the moving direction of the aquatic plant cutting apparatus, aquatic plants 55 floating in water are pushed forward in the moving direction F of the aquatic plant cutting apparatus and cannot be cut easily.

Figure 2:
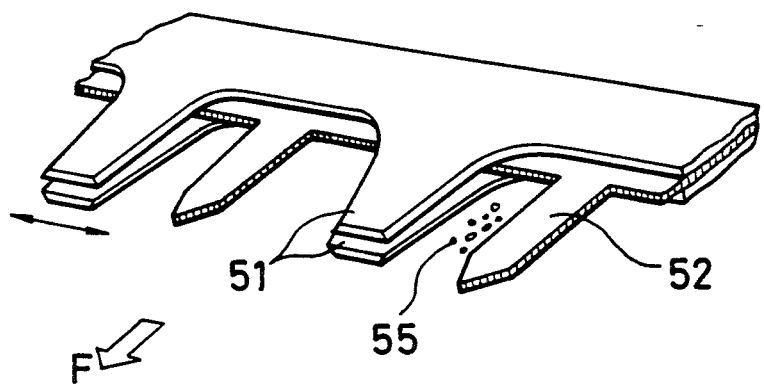
FIG. 2 is a perspective view of a conventional slide system aquatic plant cutting apparatus.

In an aquatic plant cutting apparatus of a three-edge sliding system wherein moving edges 51 and 51 are disposed on and under a fixed edge 52 as shown in FIG. 2, one of the moving edges 51 has the function of restricting the aquatic plants while the other has the function of cutting them. In comparison with the aquatic plant cutting apparatus shown in FIG. 1, this cutting apparatus has higher aquatic plant cutting performance, but it has the drawback in that a high speed operation is limited because the moving edges employ the slide system.

Figure 3:
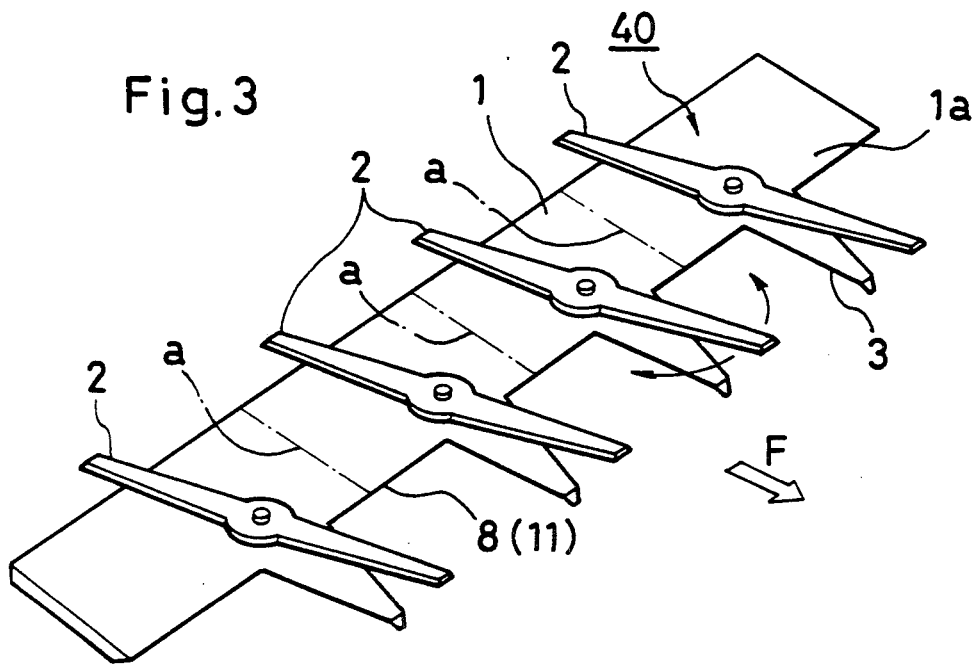
FIG. 3 is a perspective view of an aquatic plant cutting apparatus in accordance with the present invention.
Figure 4:
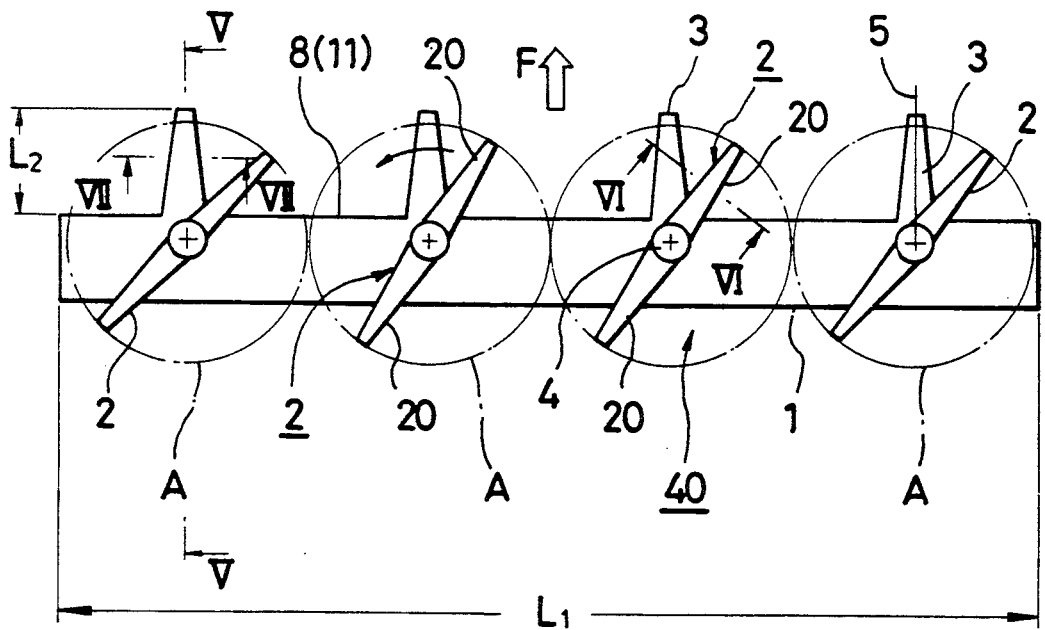
FIG. 4 is a plan view of the aquatic plant cutting apparatus in accordance with the present invention.
Figure 5:
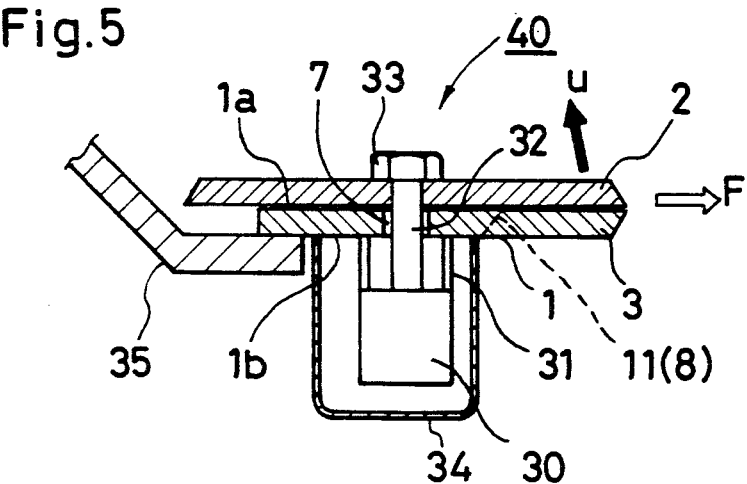
FIG. 5 is a sectional view taken along line V—V of FIG. 4.
Figure 6:
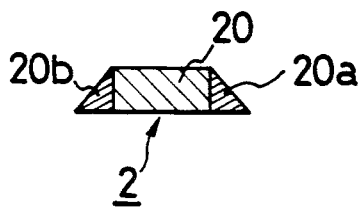
FIG. 6 is a sectional view taken along line VI—VI of FIG. 4.
Figure 7:
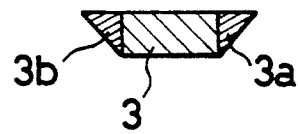
FIG. 7 is a sectional view taken along line VII—VII of FIG. 4.

In contrast, as shown in FIG. 3, the aquatic plant cutting apparatus 40 in accordance with the present invention comprises one first fixed edge 1, a plurality of rotary edges 2 and a plurality of second fixed edges 3. The first fixed edge 1 has a ribbon-like shape and has a cutting edge 11 at its front edge portion. Four rotary edges 2 are juxtaposed equidistantly along the front edge portion 8 of the fixed edge 1 on the upper surface 1a of the first fixed edge 1. As shown in FIG. 4, each rotary edge 2 is shaped by disposing radially two trapezoidal blades 20 at a boss portion 4. Each blade 20 has a cutting edge 20a on one of its sides and another cutting edge 20b on the other side, as shown in FIG. 6. Furthermore, four trapezoidal second fixed edges 3 that correspond to the rotary edges 2, respectively, and project forward from the front edge portion 8 of the first fixed edge 1, are fixed to the front edge 8 of the first fixed edge 1. Each of the second fixed edges 3 has a cutting edge 3a on one of its sides and another cutting edge 3b on the other side, as shown in FIG. 7. A hydraulic motor 30 is fitted to the lower surface 1b of the first fixed edge 1 through a fitting member 31 as shown in FIG. 5. A drive shaft 32 of this hydraulic motor 30 penetrates through a hole 7 which is bored in the first fixed edge 1 and the rotary edge 2 is fixed to the tip of the drive shaft 32 by a nut 33.

The first fixed edge 1 serves also as a base to which the rotary edges 2 and the hydraulic motor 30 are fitted. Furthermore, it serves as the base to which other components such as a motor cover 34 are fitted. The first fixed edge 1 serves as a member for fitting a frame 35 as its connection portion when this aquatic plant cutting apparatus 40 is mounted to other equipment such as a conveyor.

It is known empirically that a water flow flowing upward from the rotary edges 2 as indicated by arrow u is generated with the revolution of the rotary edges 2, as shown in FIG. 5. Accordingly, the direction of the aquatic plant cutting apparatus 40 may be turned upside down when it is desired to let the water flow with the revolution of the rotary edges 2 flow downward. Though the aquatic plant cutting apparatus 40 of the embodiment of FIG. 5 is shown disposed horizontally for convenience sake, the cutting apparatus 40 can be disposed in a desired direction such as in a longitudinal direction, in an oblique direction, and so forth.

Next, the operation of the aquatic plant cutting apparatus 40 described above will be explained.

Figure 8:
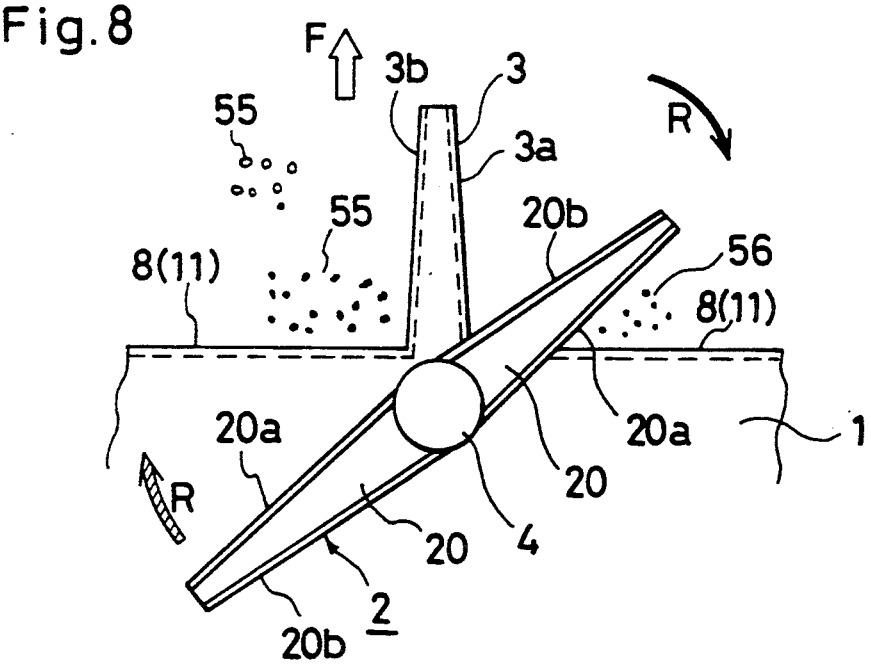
FIG. 8 is an explanatory view useful for explaining the operation of the aquatic plant cutting apparatus in accordance with the present invention.

When floating means of self-moving type (not shown) that has the aquatic plant cutting apparatus 40 fitted to its tip advances in the direction indicated by arrow F while the rotary edges 2 of the aquatic plant cutting apparatus 40 are being rotated clockwise or in the direction indicated by arrow R as shown in FIG. 8, the aquatic plants 55 come into contact with the cutting edge 11 at the front edge portion 8 of the first fixed edge 1. Then, the aquatic plants 55 flow in the transverse direction in such a manner as to escape from the cutting edge 11 of the first fixed edge 1 and are restricted by teh first and second fixed edges 1 and 3. The aquatic plants 55 that are restricted by mutually crossing two fixed edges 1 and 3 in this manner are cut by one of the blades 20 of each rotary edge 2 rotating in the direction of the arrow R. Furthermore, when this blade 20 rotates in the direction of the arrow R, the aquatic plants 56 that are restricted by the first fixed edge 11 on the right side of the second fixed edge 3 are cut by one of the blades 20 of each rotary edge 2. In other words, the aquatic plants 55 and 56 are cut by one of the blades 20 on both right and left sides of the second fixed edge 3 while the rotary edge 2 rotates once.

On the other hand, the other blade 20 of each rotary edge 2 cuts the aquatic plants on both right and left sides of the second fixed edge 3 while the rotary edge 2 rotates once. In the two-blade type rotary edge having the two blades 20, 20, therefore, cutting of hte aquatic plants is carried out four times while the rotary edge 2 rotates once. When the rotary edge 2 is rotated counterclockwise, too, the aquatic plants can be cut efficiently on the basis of the same principle as when the rotary edge 2 is rotated clockwise.

Figure 9A:
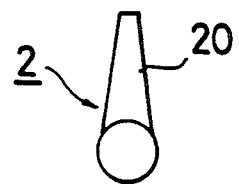
FIG. 9(a) to 9(d) are explanatory views each showing a rotary edge having a different number of blades.
Figure 9B:
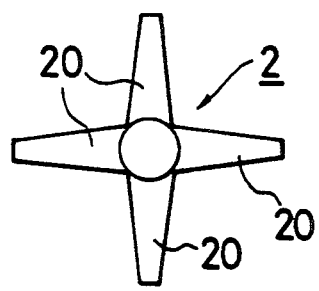
Figure 9C:
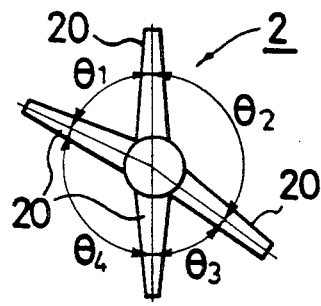
Figure 9D:
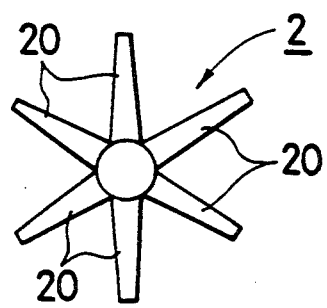

The rotary edge 2 described above is of the two-blade type having two blades, but the number of blades is not limited to two. In other words, the rotary edge 2 may be of a single-blade type such as shown in FIG. 9(a), of a four-blade type such as shown in FIGS. 9(b) and 9(c) or of a six-blade type such as shown in FIG. 9(d). The angles $\theta_1$, $\theta_2$, $\theta_3$ between the blades 20 may be different as shown in FIG. 9(c).

Figure 10A:
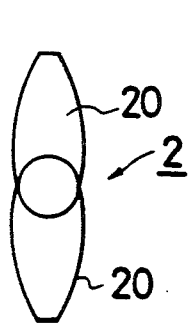
FIGS. 10(a) to 10(c) are explanatory views each showing a rotary edge having a different blade shape.
Figure 10B:
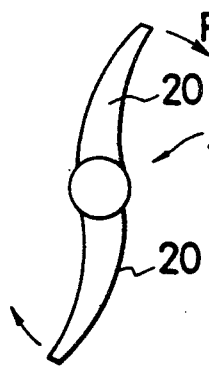
Figure 10C:
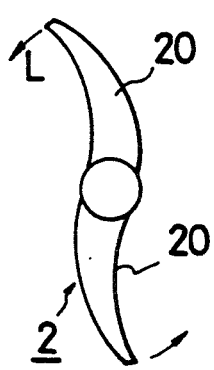
Figure 11:
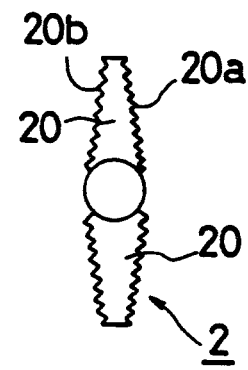
FIG. 11 is an explanatory view showing an example of the shape of a cutting edge of a blade equipped with a cutting edge.

Next, the shape of the blade 20 may be trapezoidal as shown in FIG. 9(a) but in order to cut more smoothly the aquatic plants, it is preferably spindle-shaped as shown in FIG. 10(a). Furthermore, the blade 20 has preferably a curved shape such that its foremost tip projects in the rotating direction R of the rotary edge 2 from its root portion as shown in FIGS. 10(b) and 10(c). Such a blade 20 which is curved in a direction opposite to the rotating direction has the function of gathering the aquatic plants. When the cutting edges 20a, 20b of the blade 20 are tooth-shaped such as shown in FIG. 11, the blade 20 has the function of gathering the aquatic plants, as well.

Figure 12A:
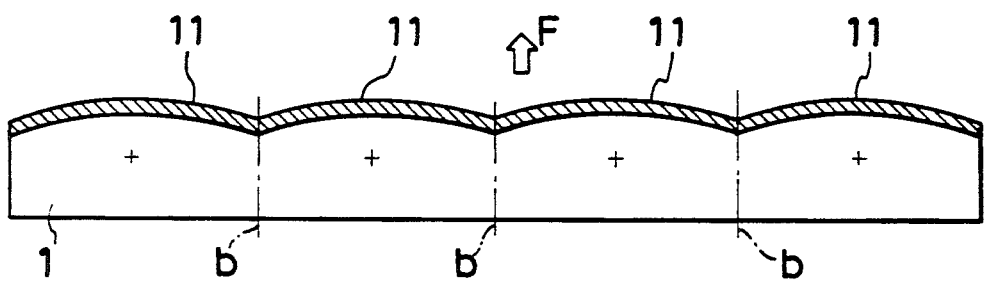
FIGS. 12(a) and 12(b) are bottom views showing another example, of the first fixed edge.
Figure 12B:
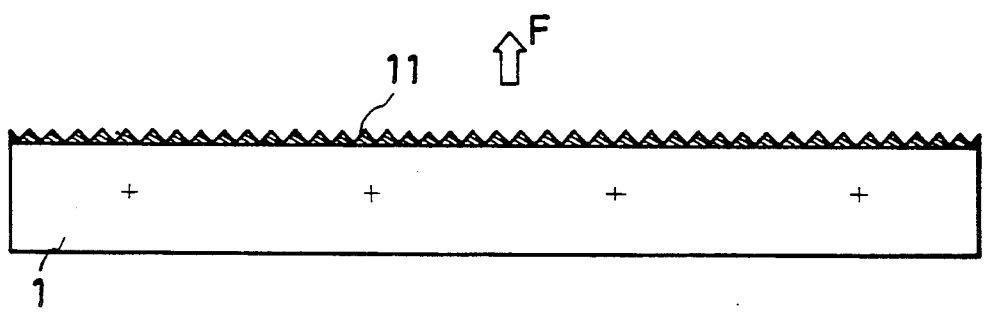
Figure 13A:
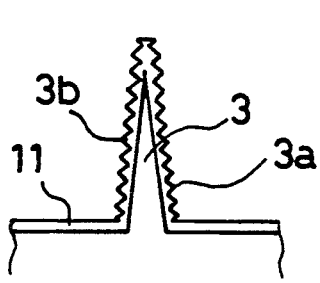
FIGS. 13(a) and 13(b) are bottom views showing another example of a second fixed edge.
Figure 13B:
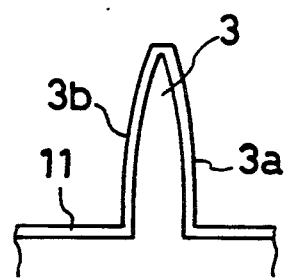

Next, the cutting edge 11 of the first fixed edge 1 may be curved for each zone divided by dot-and-chain line b as shown in FIG. 12(a). The cutting edge 11 may be zigzag as shown in FIG. 12(b). As to the fixed edges, the second fixed edge 2 may be projected ahead of the first fixed edge 1, and the fixed edge may have an arbitrary shape so long as it has more reliable restriction function of the aquatic plants. Furthermore, the length $L_1$ of the first fixed edge 1 and the length $L_2$ of the second fixed edge 3 are determiend in such a manner as to cover the operation range A of the rotary edge 2. Generally, however, they have preferably those values which are equal to, or a little bit greater than, the operation range A of the rotary edge 2. The cutting edges 3a, 3b of the second fixed edge 3 may have a zigzag shape such as a tooth shape but in order to promote smoother cutting of the aquatic plants, a curved shape such as shown in FIG. 13(b) is more suitable.

The aquatic plant cutting apparatus 40 can be used even in the minimum unit divided by one dot-chain-line a as shown in FIG. 3. However, a structure which plays the role of a base is separately necessary because the first fixed edge 1 cannot function as the base for supporting the aquatic plant cutting apparatus 40 as a whole. However, the aquatic plant cutting apparatus having this minimum unit has the advantage in that replacement of the first fixed edge 1 is easy.

Figure 14:
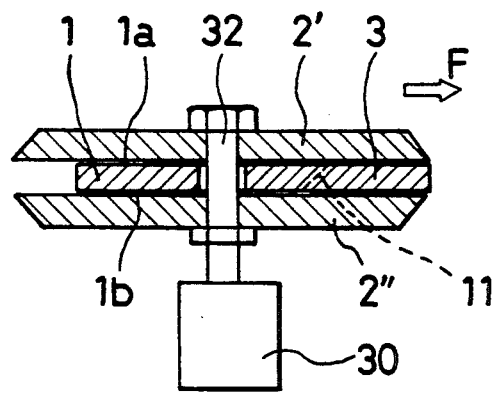
FIG. 14 is a sectional view showing another example of the aquatic plant cutting apparatus.

Next, the rotary edges 2' and 2" may be disposed on the upper and lower surfaces of the first fixed edge 1, respectively, as shown in FIG. 14. These two rotary edges 2' and 2" are rotated by the drive shaft 32 of one hydraulic motor 30. When the aquatic plants are cut, either one of the rotary edges functions as the restriction edge for restricting the aquatic plants and the other rotary edge functions as the cutting edge. Since this double-edge rotary system has higher restriction force of aquatic plants than the single-blade rotary system, cutting of the aquatic plants can be made efficiently.

The afore-mentioned first fixed edge 1 and rotary edge 2 can be combined in an arbitrary combination. In other words, the rotary edge 2 can be selected in various ways in accordance with the number of blades, the shape of blades, the shape of cutting edge, and so forth, and the first fixed edge 1, too, can be selected in various ways in accordance with the shape of cutting edge, the existence of the second fixed edge 3, the shape of the second fixed edge 3, and so forth. Furthermore, the number of rotary edges 2 is determined also by the number of revolution of the rotary edge 2. Though one rotary edge 2 is generally rotated directly by one hydraulic motor 30, it is also possible to employ a system wherein a plurality of rotary edges 2 are driven simultaneously by use of power transmission means such as a chain, a belt, and the like.

Figure 15:
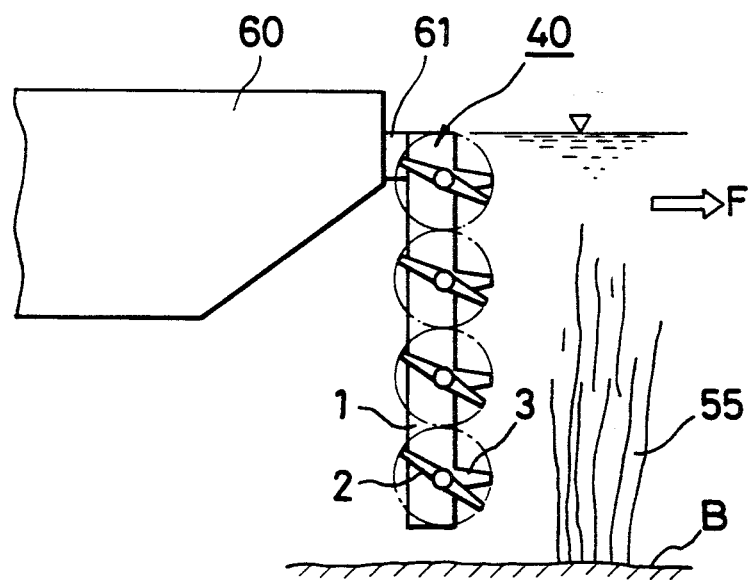
FIG. 15 is a side view of an aquatic plant recovery boat having the aquatic plant cutting apparatus of the invention fitted to the front part of floating means.
Figure 16:
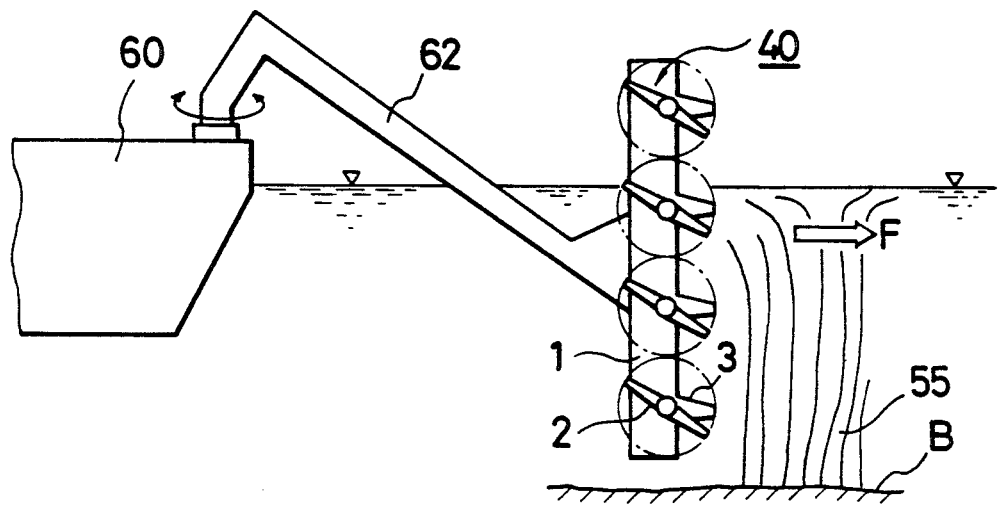
FIG. 16 is a side view of an aquatic plant recovery boat having the aquatic plant cutting apparatus of the invention fitted to the front part of floating means through an arm.

The afore-mentioned aquatic plant cutting apparatus 40 is used practically as it is fitted to the front part of floating means 60 having a propeller through a connection piece 61 as shown in FIG. 15 or as it is fitted to the front part of the floating means 60 through a rotatable arm 62 as shown in FIG. 16. Though this aquatic plant cutting apparatus 40 can be fitted to floating means not having a propeller, which is in turn towed by a power boat but such an application is not much practical.

Figure 17:
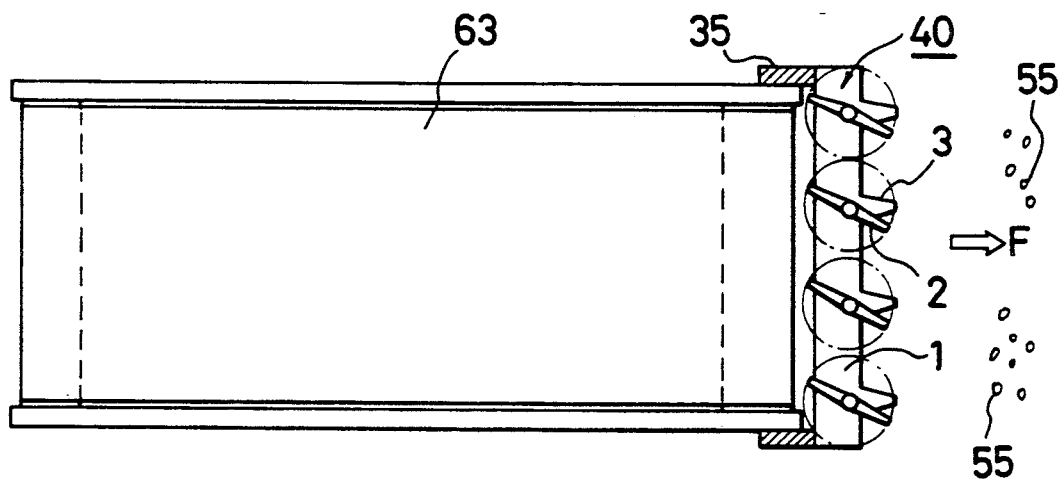
FIG. 17 is a plan view of an aquatic plant recovery boat having the aquatic plant cutting apparatus of the invention fitted to the front part of a conveyor.
Figure 18:
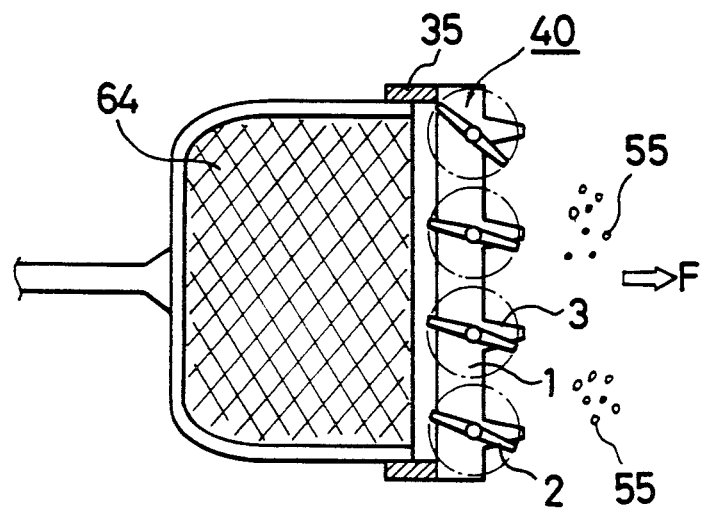
FIG. 18 is a plan view showing an aquatic plant recovery boat having the aquatic plant cutting apparatus of the invention fitted to the front part of a grab.

As described already, this aquatic plant cutting apparatus 40 has an excellent aquatic plant cutting function but the apparatus itself does not have the function of recovering the cut aquatic plants from inside water. Therefore, if this aquatic plant cutting apparatus 40 is fitted to the tip of a conveyor or grab means as a conveyor apparatus of the aquatic plants and is used in combination with them, the apparatus comes to function also as a cutting-recovery apparatus of the aquatic plants. FIG. 17 shows an aquatic plant cutting/recovery conveyor apparatus which is produced by mounting the aquatic plant cutting apparatus 40 to a conveyor 63 through a frame 35. FIG. 18 shows an aquatic plant cutting/recovery grab apparatus which is produced by fitting the aquatic plant cutting apparatus 40 to a grab 64 through a frame 35.

The aquatic plant cutting apparatus 40 may be disposed in an arbitrary direction such as in a horizontal direction, a longitudinal direction and an oblique direction having an arbitrary angle of inclination. However, the horizontal direction or longitudinal direction is ordinary when this aquatic plant cutting apparatus 40 is fitted to, or combined with, the floating means 60, the conveyor 63 and the grab 64.

Figure 19:
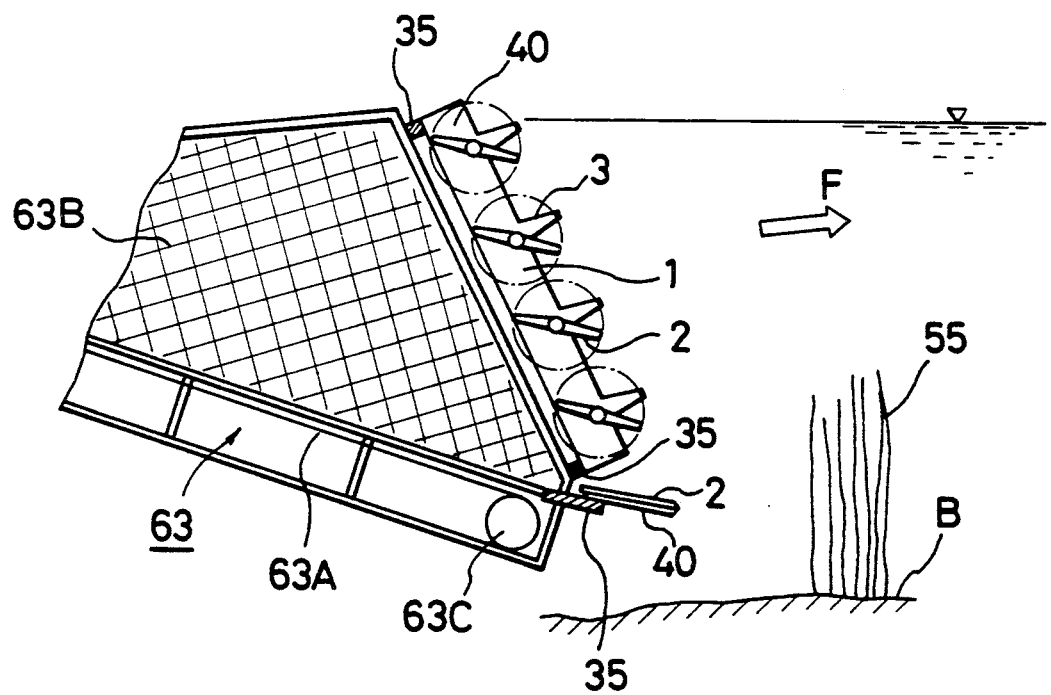
FIG. 19 is a side view of an aquatic plant recovery boat having the aquatic plant cutting apparatuses of the invention disposed horizontally in front of a conveyor and fitted also to both sides of the conveyor.

FIG. 19 shows an aquatic plant cutting/recovery conveyor apparatus which is produced by fitting this aquatic plant cutting apparatus 40 to the front surface and both sides of the conveyor 63 through the frame 35. Here, reference numeral 63A represents a conveyor main body, 63B is the upper sidewall of the conveyor main body and 63C is a conveyor pulley.

Incidentally, submersed plants such as hydrilla and hornwort extend their stems towards the water surface and as they grow, the growing area changes from the vertical direction to the transverse direction. Therefore, in order to cut these aquatic plants 55 near the river bed B, it is advisable to dispose the aquatic plant cutting apparatus 40 in the horizontal direction. To cut them near the water surface, on the other hand, an efficient cutting work can be made by disposing the aquatic plant cutting apparatus in the vertical direction.

Figure 20A:
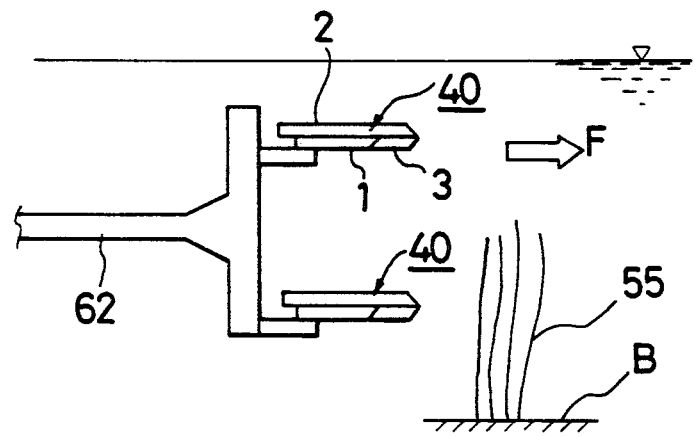
FIGS. 20(a) and 20(b) are side views showing the state where the aquatic plant cutting apparatuses of the invention are disposed in multiple stages.
Figure 20B:
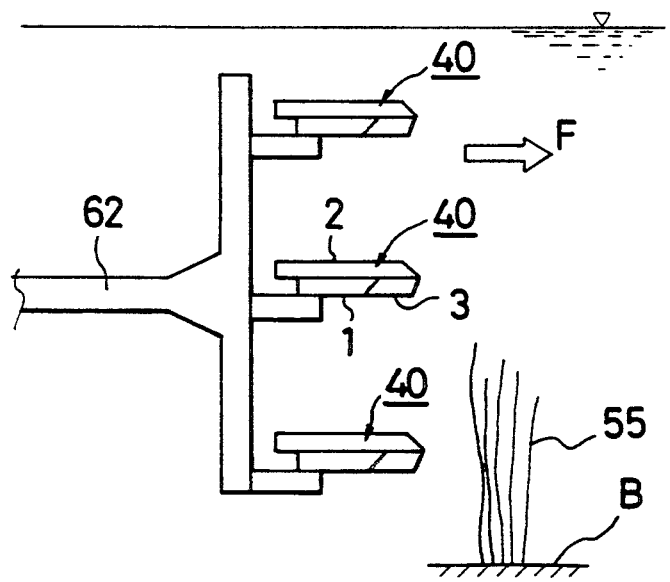

Next, FIGS. 20(a) and 20(b) show an example where the aquatic plant cutting apparatuses 40 of the present invention are disposed in multiple stages and when the aquatic plant cutting apparatuses 40 are disposed in this way, the aquatic plants 55 can be cut to small pieces. Incidentally, FIG. 20(a) shows an example where the aquatic plant cutting apparatuses 40 are mounted in two stages to an arm 62 and FIG. 20(b) shows an example where the aquatic plant cutting apparatuses 40 are mounted in three stages to the arm 62. In order for this aquatic plant cutting apparatus 40 to be provided with a cutting/recovery capability suitable for the type and growing condition of an aquatic plant 55, the size and number of the cutting edges and their dispositions are determined suitably.

What is claimed is:

1. An aquatic plant cutting apparatus comprising: a first fixed edge having a ribbon-like shape and having a cutting edge at its front edge portion; and at least one rotary edge juxtaposed along the front edge portion of said first fixed edge.

2. An aquatic plant cutting apparatus according to claim 1, wherein a second fixed edge or edges corresponding to said rotary edge are disposed in a comb-tooth shape at the front edge portion of said first fixed edge.

3. An aquatic plant cutting apparatus according to claim 1, wherein said rotary edge is rotated by a hydraulic motor fitted to said first fixed edge.

4. An aquatic plant cutting apparatus according to claim 1, wherein said rotary edge is produced by disposing radially at least one blade having a cutting edge.

5. An aquatic plant cutting apparatus according to claim 4, wherein said blade having a cutting edge is spindle-shaped.

6. An aquatic plant cutting apparatus according to claim 4, wherein said blade having a cutting edge is disposed in such a manner that its foremost tip portion projects from the root of said blade in the rotating direction of said rotary edge.

7. An aquatic plant cutting apparatus according to claim 4, wherein the cutting edge of said blade having said cutting edge has a zigzag shape like a saw-tooth shape.

8. An aquatic plant cutting apparatus according to claim 2, wherein said second fixed edge is spindle-shaped.

9. An aquatic plant cutting apparatus according to claim 2, wherein the cutting edge of said second fixed edge has a zigzag shape such as a saw-tooth shape.

10. An aquatic plant cutting apparatus according to claim 1, wherein the cutting edge of said first fixed edge is curved for each minimum constituent unit of said aquatic plant cutting apparatus.

11. An aquatic plant cutting apparatus according to claim 1, wherein the cutting edge of said first fixed edge has a zigzag shape like a saw-tooth shape.

12. An aquatic plant recovery boat characterized in that an aquatic plant cutting apparatus comprising a first fixed edge having a ribbon-like shape and having a cutting edge at the front edge portion thereof and at least one rotary edge juxtaposed along the front edge portion of said first fixed edge is fitted to floating means having a propeller through a connection member.

13. An aquatic plant recovery boat according to claim 12, wherein a conveyor for recovering aquatic plants is disposed between said floating means and said aquatic plant cutting apparatus.

14. An aquatic plant recovery boat according to claim 12, wherein a grab for recovering aquatic plants is disposed between said floating means and said aquatic plant cutting apparatus.

* * * * *